United States Patent [19]
Iwamoto

[11] Patent Number: 5,805,743
[45] Date of Patent: Sep. 8, 1998

[54] OPTICAL DEFLECTOR AND SCANNING OPTICAL SYSTEM PROVIDED WITH THE OPTICAL DEFLECTOR

[75] Inventor: Tsuyoshi Iwamoto, Kyoto, Japan

[73] Assignee: Minolta Co., Ltd., Osaka, Japan

[21] Appl. No.: 739,697

[22] Filed: Oct. 29, 1996

[30] Foreign Application Priority Data

Oct. 30, 1995 [JP] Japan .................................. 7-281957
Oct. 4, 1996 [JP] Japan .................................. 8-264911

[51] Int. Cl.$^6$ ........................................................ G02B 6/10
[52] U.S. Cl. ................................. 385/7; 385/10; 385/37; 385/130
[58] Field of Search ................................. 385/1–10, 37, 385/129, 130, 131

[56] References Cited

U.S. PATENT DOCUMENTS

| | | | |
|---|---|---|---|
| 4,693,548 | 9/1987 | Tsunoi ................................... | 350/96.13 |
| 4,707,059 | 11/1987 | Ogura et al. .......................... | 350/96.13 |
| 4,815,802 | 3/1989 | Nakamura .............................. | 350/96.13 |
| 4,929,042 | 5/1990 | Hatori et al. .......................... | 350/96.13 |
| 4,929,044 | 5/1990 | Arimoto et al. ....................... | 350/96.13 |

OTHER PUBLICATIONS

Hartmann et al., "Impulse Model Design of Acoustic Surface–Wave Filters", IEEE Transactions on Microwave Theory and Techniques, vol. MTT–21, No. 4, Apr. 1973, pp. 162–175.

*Primary Examiner*—John Ngo
*Attorney, Agent, or Firm*—McDermott, Will & Emery

[57] ABSTRACT

An optical deflector which has a waveguide, an interdigital transducer which is provided on the waveguide to convert a high-frequency signal to excite surface acoustic waves, a light incidence section for making a light beam incident to the waveguide and a light emergence section for making a light beam progressing in the waveguide emergent therefrom, and a scanning optical system provided with the optical deflector. The interdigital transducer is a chirp type and has finger electrodes which are so designed that an emergent light beam from the optical deflector will have a substantially fixed intensity in a deflection range. More specifically, the finger electrodes of the interdigital transducer are overlap-weighted so that an emergent light beam from the optical deflector will have a substantially fixed intensity in a deflection range. It is possible that the finger electrodes of the interdigital transducer have fixed widths and intervals thereamong at a portion which excites surface acoustic waves with a end frequency portion of a frequency band. Also, the interdigital transducer may have smaller variation in intervals of the finger electrodes at a portion which excites surface acoustic waves with a end frequency portion of a frequency band than at a portion which excites surface acoustic waves with a central frequency portion of the frequency band.

14 Claims, 11 Drawing Sheets

F I G. 1
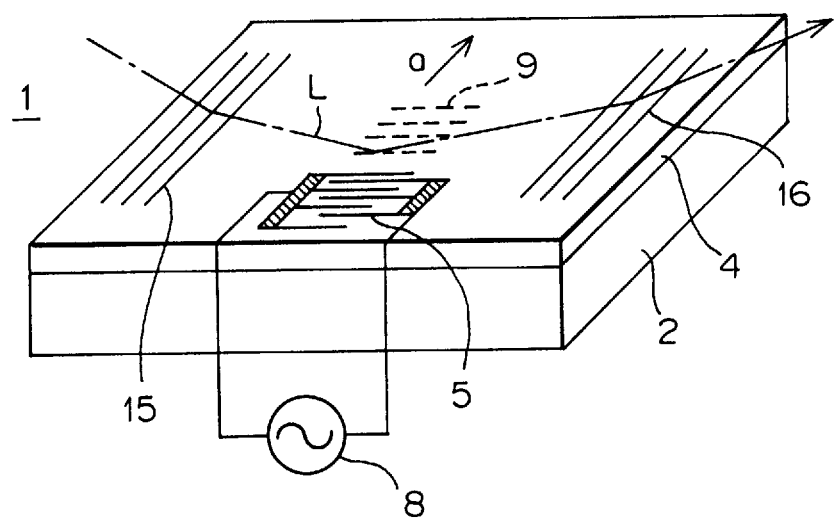
F I G. 2
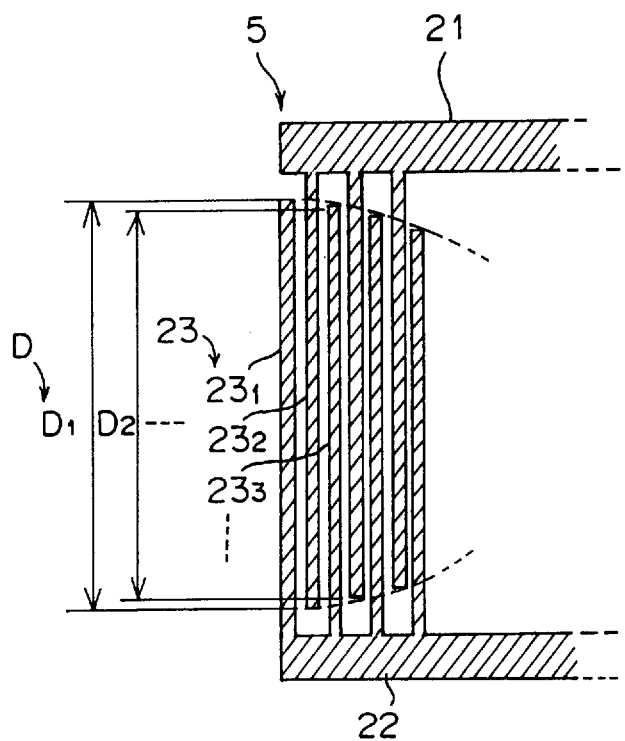

F I G. 15
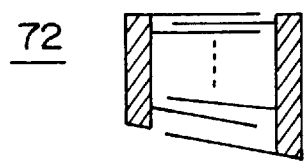
72
F I G. 16
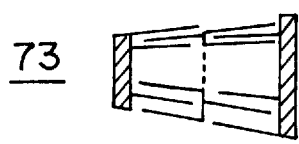
73
F I G. 17
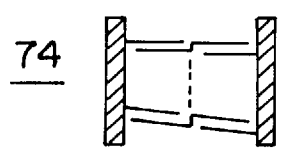
74

OPTICAL DEFLECTOR AND SCANNING OPTICAL SYSTEM PROVIDED WITH THE OPTICAL DEFLECTOR

BACKGROUND OF THE INVENTION

1. Field of the Invention

The present invention relates to an optical deflector, and more particularly to an acoustooptic deflector using a piezoelectric thin film waveguide, which is employed in an optical switch and an optical modulator of an optical computer, an optical switch, an optical branching filter and an optical modulator of an optical communicator, an optical deflecting section and an optical modulating section of a laser printer, a copying machine, a scanner, etc., and a scanning optical system provided with the optical deflector.

2. Description of Related Art

Adopting a conventional concept that a light beam progressing in a waveguide is deflected by acoustooptic interaction with surface acoustic waves propagated in the waveguide (Bragg diffraction), various types of optical deflectors have been suggested. Generally, such a deflector comprises a waveguide made of a piezoelectric material, an interdigital transducer which is provided on the waveguide to excite surface acoustic waves, light incidence means for making a light beam incident to the waveguide, and light emergence means for making the light beam progressing in the waveguide emergent from the waveguide. By varying the frequency of a high-frequency signal which is applied to the interdigital transducer, the wavelengths of the surface acoustic waves propagated in the waveguide are varied, and thereby, the deflection angle of the light beam is controlled at a high speed with a high accuracy.

Conventionally, in order to make the emergent light beam from the deflector have a fixed intensity in a wide deflection range, a chirp interdigital transducer is used to excite surface acoustic waves with a wide band. The chirp type interdigital transducer has finger electrodes which have mutually different widths and are arranged at different intervals. Compared with a regular interdigital transducer which has finger electrodes which have the same width and are arranged at uniform intervals, the chirp interdigital transducer can excite surface acoustic waves with a wide band.

As an example, a chirp interdigital transducer which has 21 finger electrodes of which widths h and intervals g vary from 2 $\mu$m to 4 $\mu$m is described. The width $h_1$ of the first finger electrode is 2 $\mu$m, and the width $h_{21}$ of the twenty-first finger electrode is 4 $\mu$m. The interval $g_1$ between the first finger electrode and the second finger electrode is 2 $\mu$m, and the interval $g_{20}$ between the twentieth finger electrode and the twenty-first finger electrode is 3.9 $\mu$m. The width $h_i$ of the "i"th finger electrode and the interval $g_i$ between the "i"th finger electrode and "i+1"th finger electrode fulfill the following expression:

$$h_i = g_i = 2 + \{(4-2)/20\} \times (i-1)$$

Accordingly, the widths h and the intervals g of the first through twenty-first finger electrodes become larger by 0.1 $\mu$m.

However, such a conventional chirp interdigital transducer has the following problem. Surface acoustic waves excited by the chirp interdigital transducer have much smaller energy at a low-frequency side portion and a high-frequency side portion than at a central portion. In other words, surface acoustic waves excited by the first and second finger electrodes and surface acoustic waves excited by the twentieth and twenty-first finger electrodes have smaller energy than surface acoustic waves excited by the tenth and eleventh finger electrodes. Therefore, the actual band width of the surface acoustic waves is narrower than designed.

As a means of solving the problem, it is possible to provide an interdigital transducer which can excite surface acoustic waves with a wider band including a necessary band for the optical deflector. However, in order to do it, the interdigital transducer should have finger electrodes which have small widths and small intervals thereamong, which requires a high technique for formation of the finger electrodes, and this results in an increase in the production cost of the optical deflector.

Even if surface acoustic waves with a wide band can be excited by using the chirp interdigital transducer, the energy of the surface acoustic waves varies in accordance with the wavelengths and is not even. Also, the propagation loss of the surface acoustic waves in a waveguide varies in accordance with the wavelengths of the surface acoustic waves. Further, the efficiency of the acoustooptic interaction (Bragg diffraction) between the surface acoustic waves and a light beam varies in accordance with the wavelengths of the surface acoustic waves. These things result in that the intensity of a emergent light beam from the deflector is not fixed in the entire deflection range.

In order to solve this problem, the following two methods have been suggested: the intensity of a light beam emitted from a light source is controlled in accordance with the wavelengths of the surface acoustic waves so that the intensity of a emergent light beam from the deflector will be fixed; and the power of the high-frequency signal applied to the interdigital transducer is controlled in accordance with the wavelengths of the surface acoustic waves so that the intensity of an emergent light beam from the deflector will be fixed.

However, these methods require a new control circuit in the light source control section or in the high-frequency signal generator control section. Also, this will shortens the life of the light source, thereby increasing the cost.

SUMMARY OF THE INVENTION

An object of the present invention is to provide an optical deflector from which an emergent light beam has a fixed intensity in a wide frequency band, and a scanning optical system provided with the optical deflector.

In order to attain the object, an optical deflector according to the present invention is a chirp type and has finger electrodes which are so designed that an emergent light beam have a fixed intensity in a deflection range. More specifically, the finger electrodes of the interdigital transducer are overlap-weighted so that an emergent light beam have a fixed intensity. The finger electrodes are overlap-weighted preferably in a method comprising the steps of: measuring a frequency response of the optical deflector which has an interdigital transducer with nonoverlap-weighted finger electrodes; calculating an inverse function of the frequency response; calculating a transducer impulse response by taking inverse Fourier transform of the inverse function; setting positions and overlapping lengths of the finger electrodes based on the transducer impulse response. The overlapping length means a length of an overlapping portion of two adjacent finger electrodes, that is, an effective opening length which is effective to excite surface acoustic waves.

Thus, only by setting positions and overlapping lengths of the finger electrodes as designed, the intensity of an emergent light beam is fixed in the deflection range. It is not necessary to add a new control circuit to the light source control section or to the high-frequency signal generator control section.

The finger electrodes of the interdigital transducer may have fixed widths and fixed periodicity at a portion which excites surface acoustic waves with a end frequency of a frequency band. Otherwise, the interdigital transducer may have smaller variation in finger electrodes periodicity at a portion which excites surface acoustic waves with an end frequency of a frequency band than at a portion which excites surface acoustic waves with a central frequency of the frequency band.

In the structures, the number of finger electrodes which excite surface acoustic waves with a high-frequency end of a frequency band and the number of finger electrodes which excite surface acoustic waves with a low-frequency end are increased, thereby enlarging the energy of the surface acoustic waves at both ends of the frequency band. Accordingly, the energy difference of the surface acoustic waves between the ends and the central of the frequency band is decreased. Therefore, the surface acoustic waves have a wide frequency band.

Further, a scanning optical system provided with such an optical deflector can form images of high quality stably.

BRIEF DESCRIPTION OF THE DRAWINGS

This and other objects and features of the present invention will be apparent from the following description with reference to the accompanying drawings, in which:

FIG. 1 is a perspective view of an optical deflector which is a first embodiment of the present invention;

FIG. 2 is a plan view of a part of a chirp interdigital transducer provided in the optical deflector shown by FIG. 1;

FIG. 15 is a plan view of a modification of the chirp interdigital transducer;

FIG. 16 is a plan view of another modification of the chirp interdigital transducer;

FIG. 17 is a plan view of another modification of the chirp interdigital transducer.

DETAILED DESCRIPTION OF THE PREFERRED EMBODIMENTS

Figure 3:
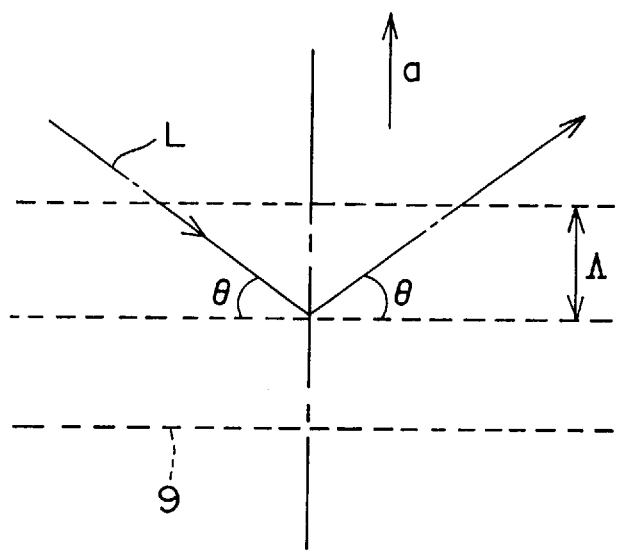
FIG. 3 is an illustration showing Bragg diffraction.

Optical deflectors and scanning optical systems which are preferred embodiments of the present invention are described with reference to the accompanying drawings.

First Embodiment: FIGS. 1 through 10

An optical deflector of the first embodiment has an interdigital transducer which has overlap-weighted finger electrodes so that an emergent light beam from the optical deflector will have a fixed intensity in a wide deflection range.

General Structure of the Optical Deflector

As shown in FIG. 1, the optical deflector 1 comprises a substrate 2, a piezoelectric thin film waveguide 4, a chirp interdigital transducer 5, an incidence grating coupler 15 and an emergence grating coupler 16.

As the substrate 2, a glass substrate, a silicone substrate, a sapphire substrate or the like is used. The waveguide 4 is formed on the substrate 2 by a laser ablation method, a sputtering method, a vacuum evaporation method, a CVD method, a sol-gel method or the like. The waveguide 4 is made of a piezoelectric material, for example, ZnO.

The chirp interdigital transducer 5 is made of Al or the like and formed on the waveguide 4 in the front center portion by a photolithograph method, a lift-off method, an etching method or the like. The interdigital transducer 5 is to convert a high-frequency electric signal generated by a high-frequency signal generator 8 into surface acoustic waves and excites surface acoustic waves on the waveguide 4.

As shown in FIG. 2, the interdigital transducer 5 has overlap-weighted finger electrodes 23 so that an emergent light beam from the deflector 1 will have a substantially fixed intensity within the deflection range. The finger electrodes 23 are overlap-weighted by an apodize method as will be described later. The interdigital transducer 5 has two mutually opposite pads 21 and 22, and the finger electrodes 23 ($23_1$, $23_2$, . . . ) extend alternately from one pad toward the other. The widths of the finger electrodes 23, the intervals thereamong and the overlapping lengths D ($D_1$, $D_2$, . . . ) vary gradually. In the first embodiment, the widths and the intervals vary from $d_a$ to $d_b$. The overlapping length D means a length of an overlapping portion of two adjacent finger electrodes 23, that is, an effective opening length which is effective to excite surface acoustic waves 9.

Further, the incidence grating coupler 15 and the emergence grating coupler 16 are disposed on the waveguide 4 at the left side portion and at the right side portion respectively. The incidence grating coupler 15 is to make a light beam L emitted from a light source (not shown) incident to the waveguide 4. The emergence grating coupler 16 is to make the light beam L progressing in the waveguide 4 emergent therefrom. Each of the grating couplers 15 and 16 has a fixed pitch. The grating couplers 15 and 16 are made of, for example, the same material as the waveguide 4. The grating couplers 15 and 16 are formed by an electron beam scanning method, a photolithograph method, a two-beam interference method or the like.

Action and Effect of the Optical Deflector

A light beam L emitted from the light source is incident to the waveguide 4 guided by the incidence grating coupler 15 and progresses in the waveguide 4. Meanwhile, a high-frequency electric signal generated by the high-frequency signal generator 8 is applied to the interdigital transducer 5. If the finger electrodes 23 of the interdigital transducer 5 have intervals Λ thereamong, surface acoustic waves 9 with wavelengths Λ are excited by the high-frequency signal with a frequency f which meets the following expression (1), and the surface acoustic waves 9 are propagated in the waveguide 4 in a direction of arrow a in FIG. 1.

$$\Lambda = v/f \tag{1}$$

v: propagation speed of the surface acoustic waves

As FIG. 3 shows, the light beam L progressing in the waveguide 4 intersects with the surface acoustic waves 9 which have wavelengths Λ and are propagated in the direction of arrow a. In FIG. 3, periodic wavefronts are shown. When the condition $\theta = \sin^{-1}(\lambda/2\Lambda)$ ($\theta$: angle of intersection of the light beam L and the surface acoustic waves 9, $\lambda$: wavelength of the light beam L) is fulfilled, Bragg diffraction by an acoustooptic effect occurs, and the light beam L is diffracted and deflected. The deflected light beam L is emergent from the deflector 4 guided by the emergence grating coupler 16.

As described above, the widths of the finger electrodes 23 and the intervals thereamong vary gradually from $d_a$ to $d_b$. Therefore, if a high-frequency signal with a frequency band from $f_a = v/\Lambda_a$ to $f_b = v/\Lambda_b$ is applied to the interdigital transducer 5, surface acoustic waves 9 with a wavelength band from $\Lambda_a$ to $\Lambda_b$ ($\Lambda_a = 4d_a$, $\Lambda_b = 4d_b$) are excited. Accordingly, the deflection angle $\theta$ varies from $\theta_a = \sin^{-1}(\lambda/\Lambda_a)$ to $\theta_b = \sin^{-1}(\lambda/2\Lambda_b)$. It is preferred that the variation of the deflection angle $\theta$ is large.

Figure 4:
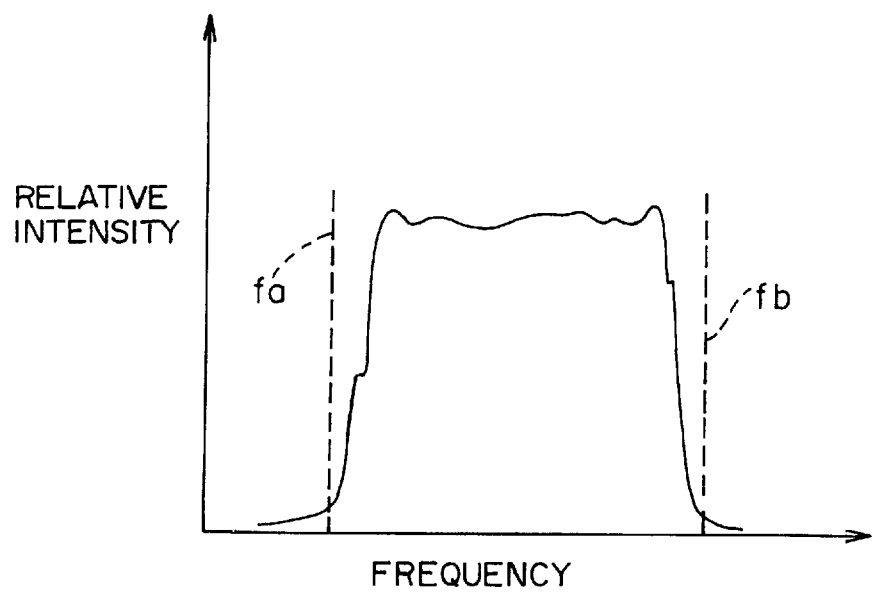
FIG. 4 is a graph showing a frequency deflection characteristic of the optical deflector shown by FIG. 1.
Figure 5:
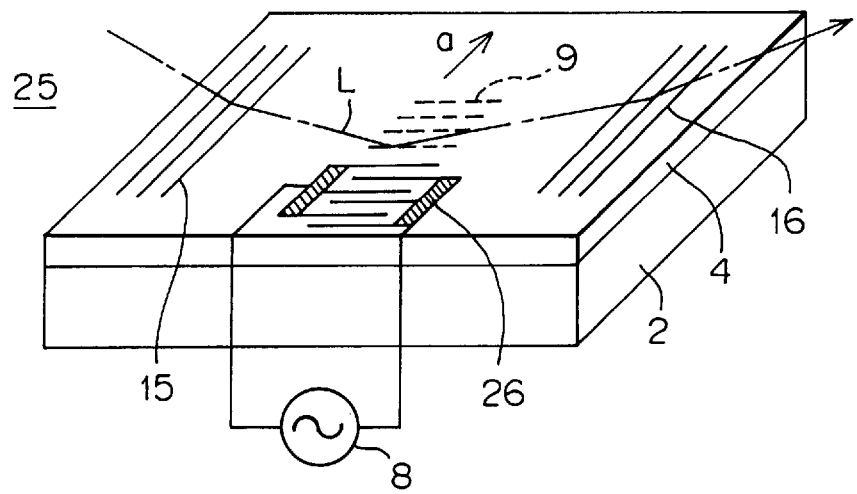
FIG. 5 is a perspective view of an optical deflector used for design of the chirp interdigital transducer shown by FIG. 2.
Figure 6:
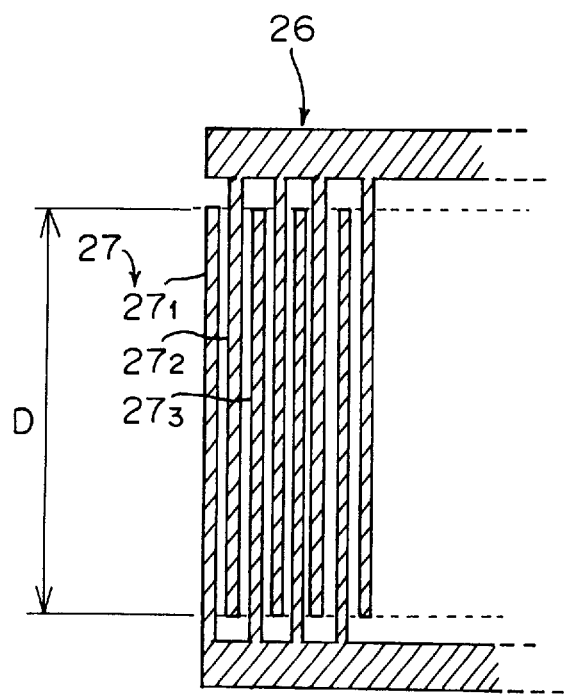
FIG. 6 is a plan view of a part of a chirp interdigital transducer provided in the optical deflector shown by FIG. 5.

In the optical deflector 1, as described, the finger electrodes 23 of the chirp interdigital transducer 5 are overlap-weighted so that an emergent light beam from the deflector 1 will have a substantially fixed intensity in the entire deflection range. By setting the positions and the overlapping lengths of the finger electrodes 23 as designed, without adding a new control circuit to the control section of the light source or to the control section of the high-frequency signal generator 8, as shown in FIG. 4, an emergent light beam from the deflector 1 can have a substantially fixed intensity in the entire deflection range. FIG. 4 is a graph showing the frequency deflection characteristic of the deflector 1. The y-axis of the graph indicates the relative intensity of an emergent light beam from the deflector 1, and the x-axis of the graph indicates the frequency of the high-frequency signal applied to the interdigital transducer 5.

Weighting of the Finger Electrodes

Next, overlap-weighting of the finger electrodes 23 of the interdigital transducer 5 by an apodize method is described.

The apodize method is a method of overlap-weighting finger electrodes by varying the overlapping lengths among the finger electrodes, using the fact that the impulse response of an interdigital transducer which depends on the positions and the overlapping lengths of finger electrodes and the frequency response of the interdigital transducer have a mutual relationship of Fourier transformation. More specifically, first, a desired frequency response wave is determined, and an impulse response wave which is in inverse Fourier transform of the frequency response wave is calculated. Then, the axis indicating time of the impulse response wave is replaced by an axis indicating positions of finger electrodes, and the amplitude of the wave at each finger electrode position is read as a relative overlapping length of the finger electrode.

Figure 7:
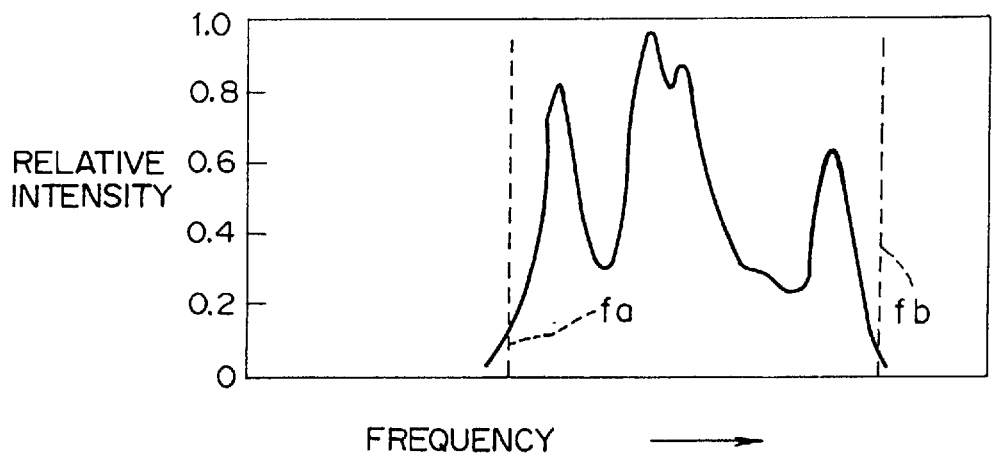
FIG. 7 is a graph showing a frequency deflection characteristic of the optical deflector shown by FIG. 5.

In this embodiment, the frequency response wave which is a basis of calculation for the impulse response wave is characteristic. First, the frequency deflection characteristic of an optical deflector 25 (see FIG. 5) which has an interdigital transducer 26 with nonoverlap-weighted finger electrodes is measured. The interdigital transducer 26 is a chirp type and has finger electrodes 27 ($27_1$, $27_2$, $27_3$, ...) which overlap one another by a fixed length D. For example, a graph shown in FIG. 7 is obtained as the frequency deflection characteristic of the deflector 25. The y-axis indicates the relative intensity of an emergent light beam from the deflector 25, and the x-axis indicates the frequency of the high-frequency signal applied to the interdigital transducer 26.

Figure 8:
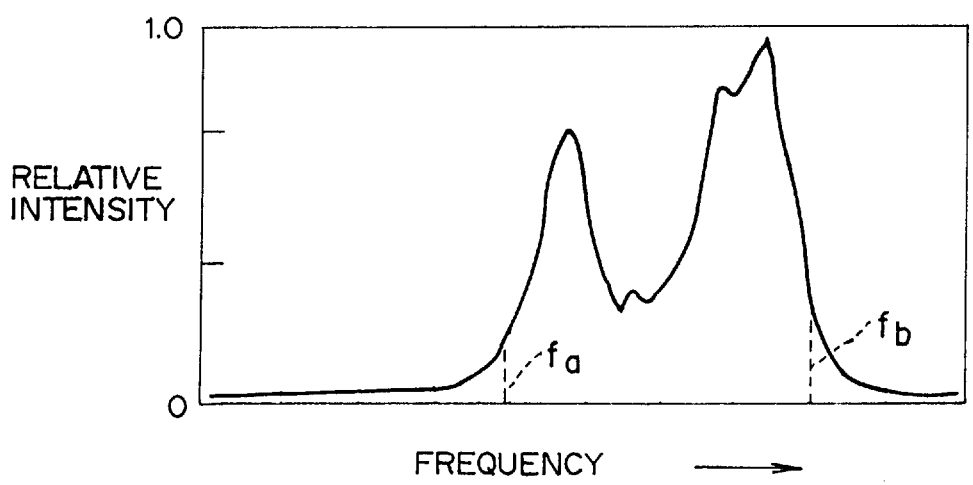
FIG. 8 is a graph showing an inverse function of the frequency deflection characteristic shown by FIG. 7.
Figure 9A:
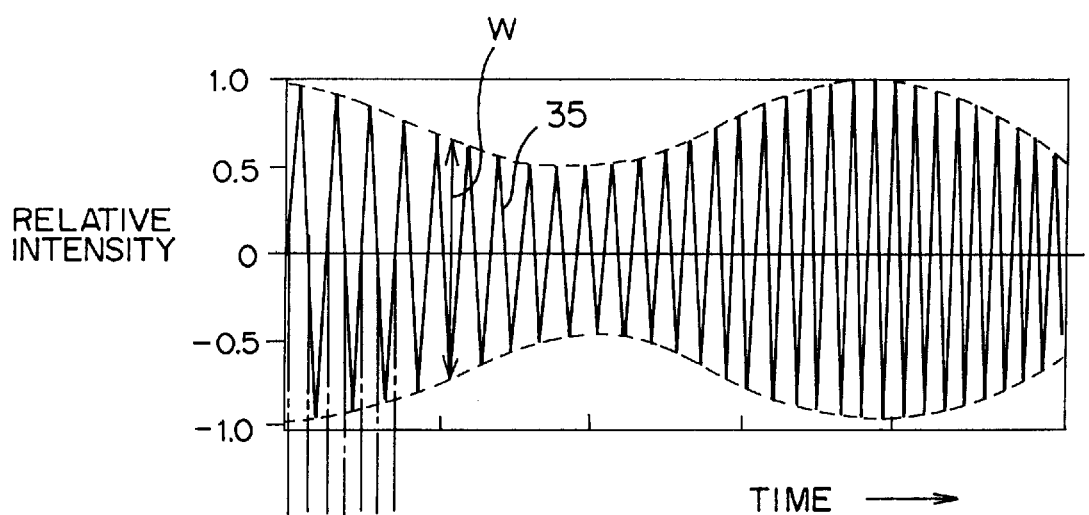
FIG. 9A is a graph showing an impulse response wave of the inverse function shown by FIG. 8.
Figure 9B:
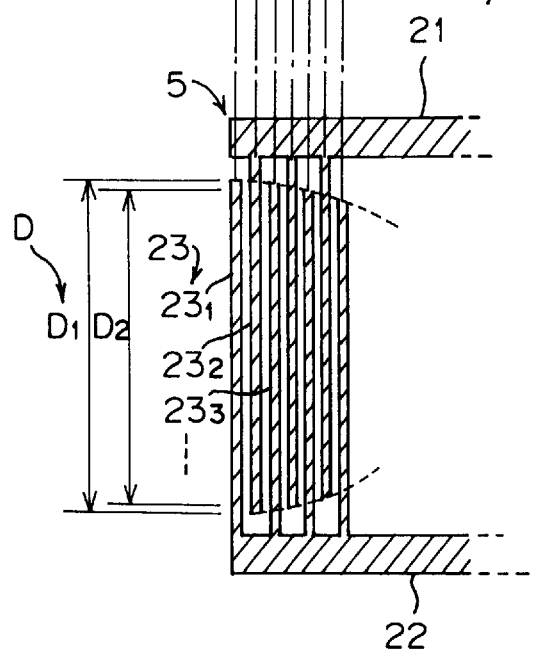
FIG. 9B is a plan view of a part of an interdigital transducer which has finger electrodes overlap-weighted based on the impulse response wave.
Figure 10:
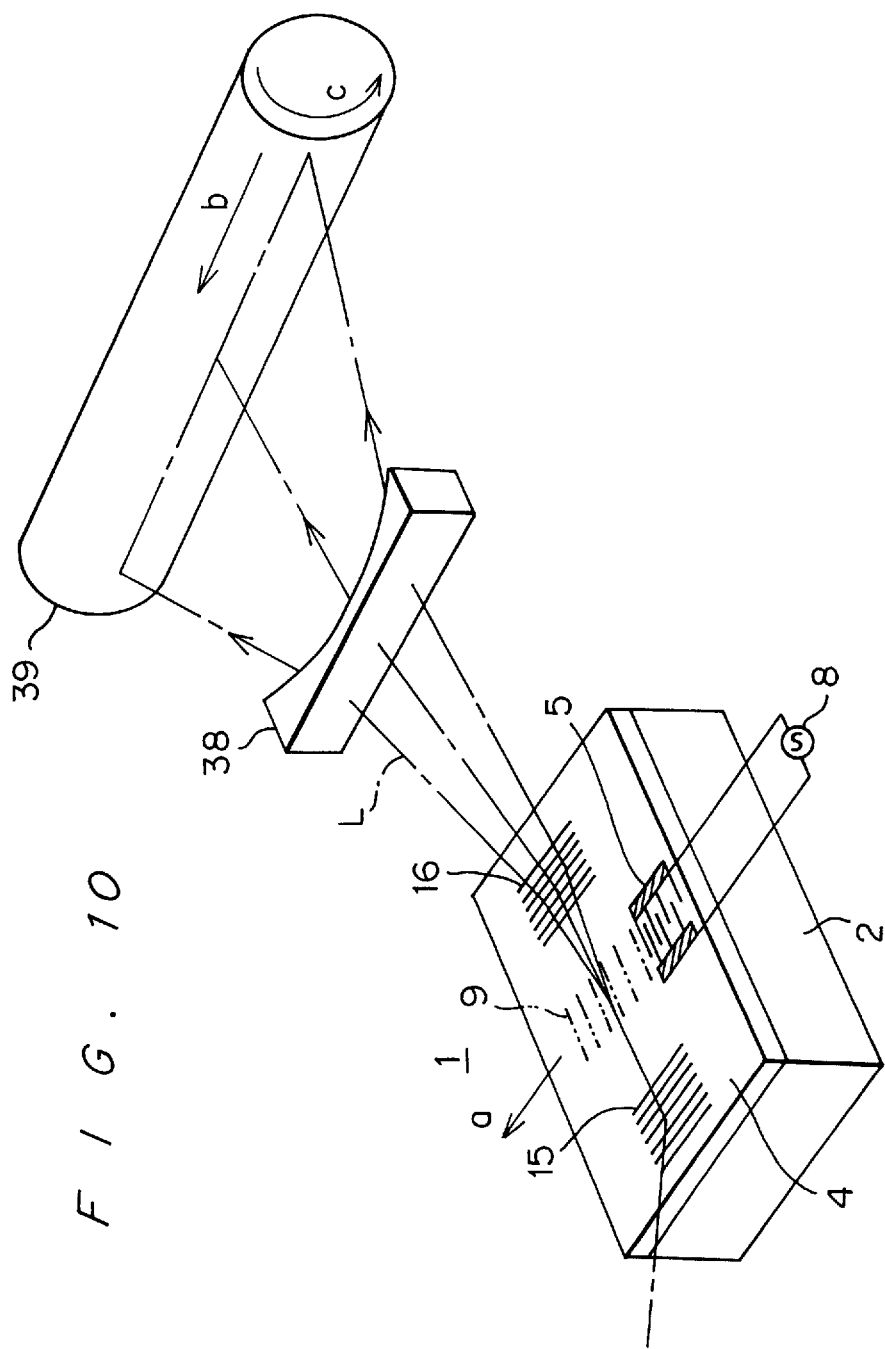
FIG. 10 is a perspective view of a scanning optical system provided with the optical deflector shown by FIG. 1.

Next, the inverse function of the frequency deflection characteristic is calculated. FIG. 8 is a graph showing the frequency inverse function. The frequency inverse function is regarded as the frequency response wave. The impulse response wave of the chirp interdigital transducer is calculated by inverse Fourier transform of the frequency inverse function. FIG. 9A shows the calculated impulse response wave. Next, the axis indicating time of the impulse response wave 35 is replaced by an axis indicating positions of finger electrodes. A value which is calculated by multiplying a time when the impulse response wave 35 intersects the x-axis by the propagation speed v of the surface acoustic waves 9 is a relative position of a finger electrode 23 as shown in FIG. 9B. The amplitude W of the impulse response wave 35 at that time is a relative overlapping length D of the finger electrode 23.

In this way, the finger electrodes 23 of the chirp interdigital transformer 5 are overlap-weighted. When a high-frequency signal with a frequency band from $f_a$ to $f_b$ is applied to the chirp interdigital transformer 5, the interdigital transformer 5 excites surface acoustic waves 9 with uneven energy in a wavelength band from $\Lambda_a$ to $\Lambda_b$ as shown in FIG. 8. The emergent light beam from the deflector 1, which is a result of an acoustooptic interaction of the light beam and the surface acoustic waves 9 with energy shown by FIG. 8, has a substantially fixed intensity in the entire deflection range as shown in FIG. 4.

Adoption of the Optical Deflector in a Scanning Optical System

Next, the action and effect of the optical deflector 1 in an optical printer which comprises the optical deflector 1, a lens system 38 and a photosensitive drum 39 (see FIG. 10) is described.

When a high-frequency signal generated by the high-frequency signal generator 8 is applied to the interdigital transducer 5, surface acoustic waves 9 are excited on the waveguide 4. Because the chirp interdigital transducer 5 has overlap-weighted finger electrodes, the surface acoustic waves 9 have an energy distribution shown by FIG. 8. The surface acoustic waves 9 are propagated on the waveguide 4 in the direction of arrow a. Meanwhile, a light beam L emitted from the light source is incident to the waveguide 4 guided by the incidence grating coupler 15 and progresses in the waveguide 4.

The surface acoustic waves 9 intersect the light beam L. The light beam L is deflected by acoustooptic interaction with the surface acoustic waves 9 and is emergent from the deflector 1 guided by the emergence grating coupler 16. The emergent light beam L has a frequency deflection characteristic shown by FIG. 4, and the intensity is fixed in the entire deflection range.

The emergent light beam L is imaged on the photosensitive drum 39 via the lens system 38 and is scanned on the photosensitive drum 39 in a direction of arrow b (main scanning). The photosensitive drum 39 is driven to rotate in a direction of arrow c at a constant speed, resulting in sub-scanning. By the main scanning in the direction of arrow b and the sub scanning in the direction of arrow c, an electrostatic latent image is formed on the photosensitive drum 39. Thus, the scanning optical system can form images of high quality stably.

Figure 11:
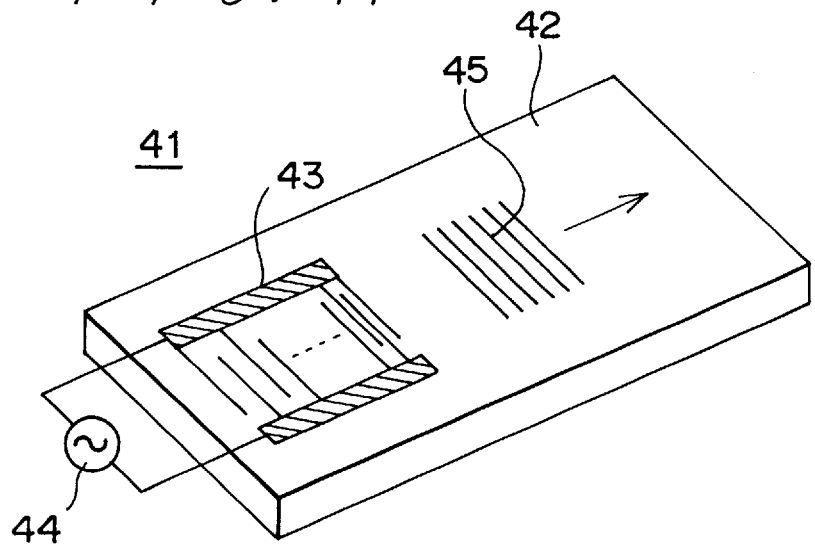
FIG. 11 is a perspective view of an optical deflector which is a second embodiment of the present invention.
Figure 12:
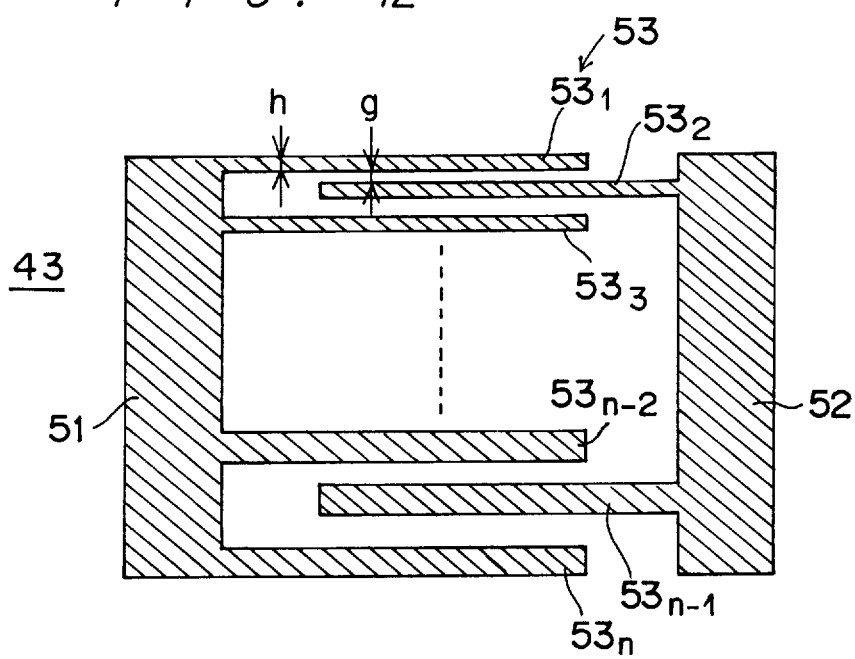
FIG. 12 is a plan view of a part of a chirp interdigital transducer provided in the optical deflector shown by FIG. 11.
Figure 13:
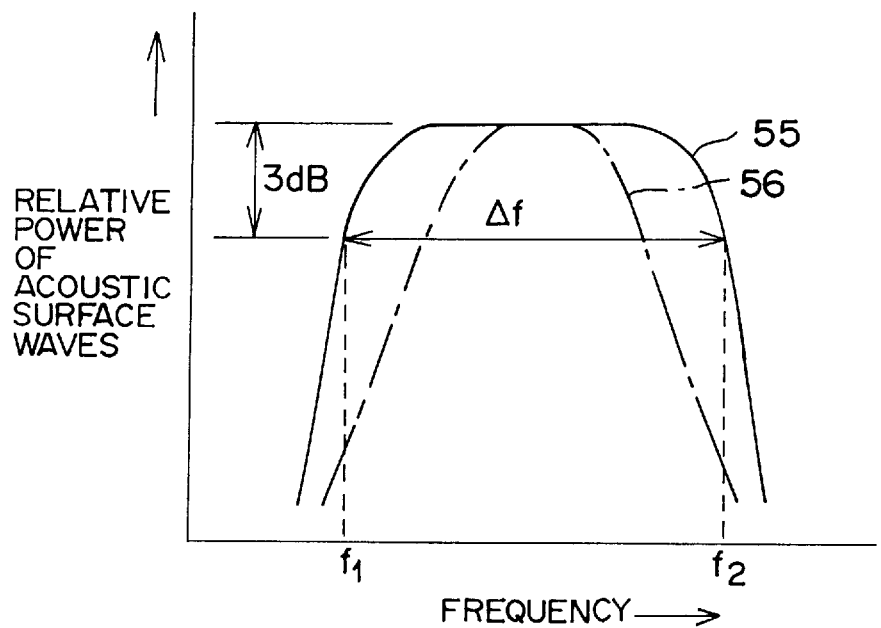
FIG. 13 is a graph showing a frequency characteristic of the chirp interdigital transducer shown by FIG. 12.

Second Embodiment: FIGS. 11 through 13

An optical deflector of the second embodiment has an interdigital transducer which is designed to excite surface acoustic waves which have larger energy at ends of the frequency band, and thereby, an emergent light beam from the deflector has a fixed intensity in a wide deflection range.

FIG. 11 shows the optical deflector 41 of the second embodiment. The optical deflector 41 comprises a piezoelectric substrate 42 which functions as a waveguide, a chirp interdigital transducer 43 formed on the piezoelectric substrate 42, light incidence means and light emergence means. In FIG. 11, the light incidence means and the light emergence means are not shown.

As the piezoelectric substrate 42, for example, a $LiNbO_3$ substrate, a $LiTaO_3$ substrate, a $LiNbO_3$ substrate with a surface layer with dispersed Ti, a $LiNbO_3$ substrate with a surface layer processed with proton exchange, a sapphire substrate with a piezoelectric thin film such as a ZnO thin film on a surface, a glass substrate with a piezoelectric thin film such as a ZnO thin film on a surface or the like is used.

The chirp interdigital transducer 43 is formed on the piezoelectric substrate 42 at an end portion by a vacuum evaporation method, a dry etching method or the like. When a high-frequency signal generated by a high-frequency signal generator 44 is applied to the interdigital transducer 43, the interdigital transducer 43 excites surface acoustic waves 45 on the piezoelectric substrate 42. The high-frequency signal generator 44 is, for example, a VCO (voltage controlling oscillator).

Now, the shape of the interdigital transducer 43 is described, referring to FIG. 12, which is a plan view of the interdigital transducer 43. The interdigital transducer 43 has mutually opposite pads 51 and 52, and a plural number n of finger electrodes 53 ($53_1$, $53_2$, ... $53_n$) extend alternately from one pad toward the other (n=29 in the second embodiment).

The widths h of the finger electrodes 53 and the intervals g thereamong are fixed at both end portions, that is, an end portion which excites surface acoustic waves with a high-frequency end of the frequency band and the other end portion which excites surface acoustic waves with a low-frequency end. More specifically, the widths h of the first through fourth finger electrodes $53_1$ through $53_4$ and the intervals g thereamong are 2 $\mu$m, and the widths h of the twenty-sixth through twenty-ninth finger electrodes $53_{26}$ through $53_{29}$ and the intervals g thereamong are 4 $\mu$m. The widths h of the fifth through twenty-fifth finger electrodes $53_5$ through $53_{25}$ and the intervals g thereamong fulfill the following expression (2), in which $h_i$ indicates the width of the "i"th finger electrode $53_i$, and $g_i$ indicates the interval between the "i"th finger electrode $53_i$ and the "i+1"th finger electrode $53_{i+1}$.

$$h_i = g_i = 2 + \{(4-2)/20\} \times (i-5) \quad (2)$$

Accordingly, the widths h of the fifth through the twenty-fifth finger electrodes $53_5$ through $53_{25}$ and the intervals g thereamong become larger from 2 $\mu$m to 4 $\mu$m by 0.1 $\mu$m.

The solid line 55 in FIG. 13 shows the frequency characteristic of the interdigital transducer 43. For comparison, the frequency characteristic of a conventional interdigital transducer is shown by the alternate long and short dash line 56. The wavelengths $\Lambda$ of the surface acoustic waves 45 excited by the interdigital transducer 43 and the widths h of the finger electrodes 53 have mutual relationship expressed by the following expression (3).

$$\Lambda = 4h \quad (3)$$

The frequency f of the surface acoustic waves 45 and the wavelengths $\Lambda$ have a mutual relationship expressed by the following expression (4).

$$f = v/\Lambda \quad (4)$$

v: propagation speed of the surface acoustic waves

If the piezoelectric substrate 42 is a Y cut $LiNbO_3$ substrate and if the surface acoustic waves 45 are propagated in the Z direction, the speed of the surface acoustic waves 45 is 3488 m/sec. Therefore, the following expression (5) is obtained from the expressions (3) and (4).

$$f = 3488 \times 10^6 / 4h \quad (5)$$

Since the widths h of the finger electrode 53 vary from 2 $\mu$m to 4 $\mu$m, the surface acoustic waves 45 excited by the interdigital transducer 43 have a frequency band from $f_1$=218 MHz (the frequency of surface acoustic waves excited by the finger electrodes 53 with widths h of 4 $\mu$m) to $f_2$=436 MHz (the frequency of surface acoustic waves excited by the finger electrodes 53 with widths h of 2 $\mu$m). As is apparent from FIG. 13, the frequency characteristic of the interdigital transducer 43 is that the frequencies $f_1$ and $f_2$ at both side portions of the band width are included in the 3 dB band width $\Delta f$ (see the solid line 55), while the frequency characteristic of the conventional interdigital transducer is that the frequencies $f_1$ and $f_2$ are not included in the 3 dB band width $\Delta f$ (see the alternate long and short dash line 56).

In the chirp interdigital transducer 43, the number of finger electrodes 53 which excite surface acoustic waves with a high-frequency end of the band and the number of finger electrodes 53 which excite surface acoustic waves with a low-frequency end are large, compared with conventional interdigital transducers. Thereby, the energy of the high-frequency end and the energy of the low-frequency end are increased, and the difference of energy between the both ends of the band and the central is decreased. Thus, the chirp interdigital transducer 43 of the optical deflector 41 has a frequency characteristic with a wider band than conventional interdigital transducers, and an emergent light beam from the deflector 41 has a substantially fixed intensity in the entire deflection range. Further, a scanning optical system provided with the optical deflector 41 can form images of high quality stably.

Third Embodiment

An optical deflector of the third embodiment has an interdigital transducer which is designed to excite surface acoustic waves which have larger energy at ends of the frequency band, and thereby, an emergent light beam from the deflector has a fixed intensity in a wide deflection range.

The optical deflector of the third embodiment comprises a piezoelectric substrate which functions as a waveguide, a chirp interdigital transducer formed on the piezoelectric substrate, light incidence means and light emergence means. The shape of the interdigital transducer is similar to that of the interdigital transducer of the second embodiment shown in FIG. 12. The interdigital transducer has two mutually opposite pads, and a number n of finger electrodes extend alternately from one pad toward the other (n=35 in the third embodiment).

The widths h of the finger electrodes and the intervals g thereamong are fixed in two sections at each end portion, that is, in an end portion which excites surface acoustic waves with a high-frequency end of the frequency band and in the other end portion which excites surface acoustic waves with a low-frequency end. More specifically, the widths h of the first through fourth finger electrodes and the intervals g thereamong are 2 $\mu$m, and the widths h of the fifth through seventh finger electrodes and the intervals g thereamong are 2.1 $\mu$m. The widths h of the twenty-ninth through thirty-first finger electrodes and the intervals g thereamong are 3.9 $\mu$m, and the widths h of the thirty-second through thirty-fifth finger electrodes and the intervals g thereamong are 4 $\mu$m. The widths h of the eighth through twenty-eighth finger electrodes and the intervals g thereamong fulfill the following expression (6), in which $h_i$ indicates the width of the "i"th finger electrode, and $g_i$ indicates the interval between the "i"th finger electrode and the "i+1"th finger electrode.

$$hi=gi=2.2+\{(3.8-2.2)/20\}\times(i-8) \tag{6}$$

Accordingly, the widths h of the eighth through twenty-eighth finger electrodes and the intervals g thereamong become larger from 2.2 $\mu$m to 3.8 $\mu$m by 0.1 $\mu$m.

The action and effect of the optical deflector of the third embodiment are similar to those of the optical deflector of the second embodiment.

Figure 14:
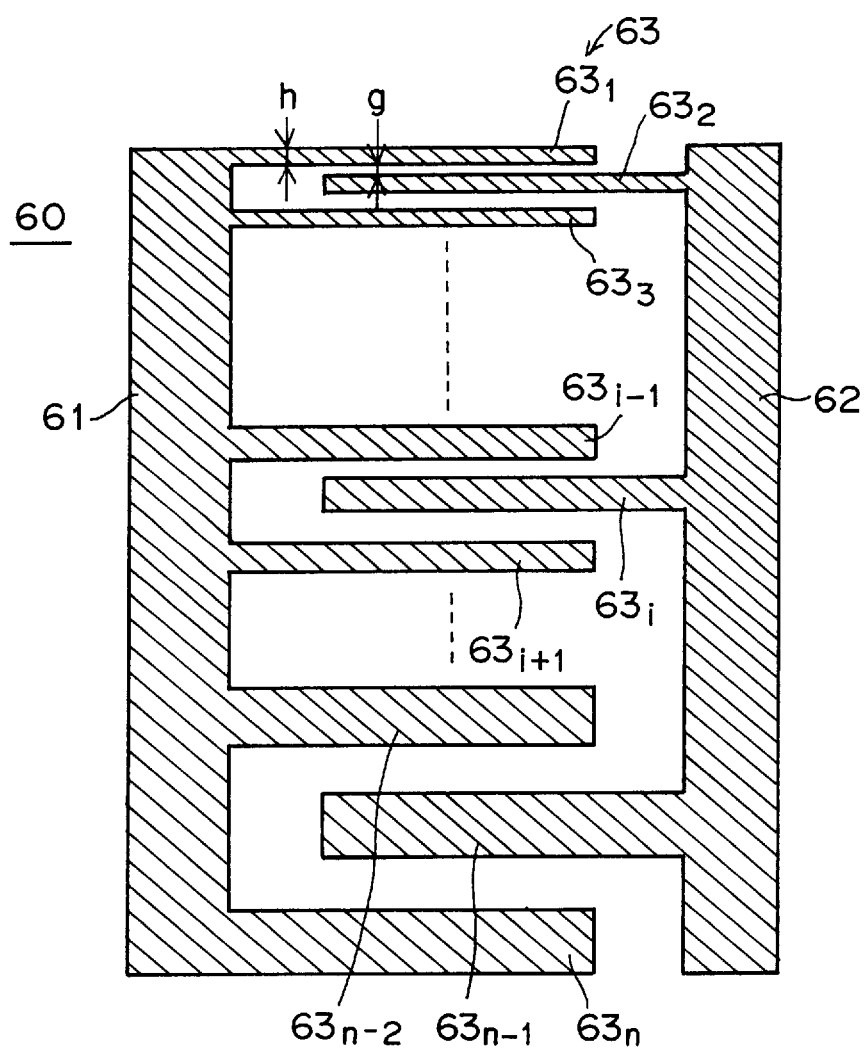
FIG. 14 is a plan view of a chirp interdigital transducer provided in an optical deflector which is a fourth embodiment of the present invention.

Fourth Embodiment: FIG. 14

An optical deflector of the fourth embodiment has an interdigital transducer which is designed to excite acoustic surface waves which have larger energy at ends of the frequency band, and thereby, an emergent light beam from the deflector has a fixed intensity in a wide deflection range.

The optical deflector of the fourth embodiment comprises a piezoelectric substrate which functions as a waveguide, a chirp interdigital transducer formed on the piezoelectric substrate, light incidence means and light emergence means. As shown in FIG. 14, the interdigital transducer 60 has two mutually opposite pads 61 and 62, and a number n of finger electrodes 63 ($63_1$, $63_2$, ... $63_n$) extend alternately from one pad toward the other (n=25 in the fourth embodiment).

The variation of the widths h of the finger electrodes 63 and the variation of the intervals g thereamong are smaller at both end portions, that is, an end portion which excites surface acoustic waves with a high-frequency end of the frequency band and the other end portion which excites surface acoustic waves with a low-frequency end than at the central portion which excites surface acoustic waves with a central of the frequency band. More specifically, the widths h of the first through fifth finger electrodes $63_1$ through $63_5$ and the intervals g thereamong become larger from 2.0 $\mu$m to 2.2 $\mu$m by 0.05 $\mu$m, and the widths h of the twenty-first through twenty-fifth finger electrodes $63_{21}$ through $63_{25}$ and the intervals g thereamong become larger from 3.8 $\mu$m to 4.0 $\mu$m by 0.05 $\mu$m. The widths h of the sixth through twentieth finger electrodes $63_6$ through $63_{20}$ and the intervals g thereamong fulfill the following expression (7), in which $h_i$ indicates the width of the "i"th finger electrode, and $g_i$ indicates the interval between the "i"th finger electrode and the "i+1"th finger electrode.

$$h_i=g_i=2.3+\{(3.7-2.3)/14\}\times(i-6) \tag{7}$$

Accordingly, the widths h of the sixth through twentieth finger electrodes $63_6$ through $63_{20}$ and the intervals g thereamong become larger from 2.3 $\mu$m to 3.7 $\mu$m by 0.1 $\mu$m.

In the chirp interdigital transducer 60, the number of finger electrodes 63 which excite surface acoustic waves with a high-frequency end of the band and the number of finger electrodes 63 which excite surface acoustic waves with a low-frequency end are large, compared with conventional interdigital transducers. Thereby, the energy of the high-frequency side portion and the energy of the low-frequency side portion are increased, and the difference of energy between the both ends of the band and the central is decreased.

Thus, the chirp interdigital transducer 60 of the optical deflector of the fourth embodiment has a frequency characteristic with a wider band than conventional interdigital transducers, and an emergent light beam from the deflector has a substantially fixed intensity in the entire deflection range. Further, a scanning optical system provided with the optical deflector can form images of high quality stably.

Fifth Embodiment

An optical deflector of the fifth embodiment has an interdigital transducer which is designed to excite acoustic surface waves which have larger energy at ends of the frequency band, and thereby, an emergent light beam from the deflector has a fixed intensity in a wide deflection range.

The optical deflector of the fifth embodiment comprises a piezoelectric substrate which functions as a waveguide, a chirp interdigital transducer formed on the piezoelectric substrate, light incidence means and light emergence means. The shape of the interdigital transducer is similar to that of the interdigital transducer of the fourth embodiment shown in FIG. 14. The interdigital transducer has two mutually opposite pads, and a number n of finger electrodes extend alternately from one pad toward the other (n=27 in the fifth embodiment).

The variation of the widths h of the finger electrodes and the variation of the intervals g thereamong are smaller at both end portions, that is, an end portion which excites surface acoustic waves with a high-frequency end of the frequency band and the other end portion which excites surface acoustic waves with a low-frequency end than at the central portion which excites surface acoustic waves with a central of the frequency band. More specifically, the widths h of the first through fifth finger electrodes and the intervals g thereamong become larger from 2.0 $\mu$m to 2.2 $\mu$m by 0.05 $\mu$m, and the widths h of the sixth through ninth finger electrodes and the intervals g thereamong become larger from 2.275 $\mu$m to 2.35 $\mu$m by 0.075 $\mu$m. The widths h of the nineteenth through twenty-second finger electrodes and the intervals g thereamong become larger from 3.5 $\mu$m to 3.725 $\mu$m by 0.075 $\mu$m, and the widths h of the twenty-third through twenty-seventh finger electrodes and the intervals g thereamong become larger from 3.8 $\mu$m to 4.0 $\mu$m by 0.05 $\mu$m. The widths h of the tenth through eighteenth finger electrodes and the intervals g thereamong fulfill the following expression (8), in which $h_i$ indicates the width of the "i"th finger electrode, and $g_i$ indicates the interval between the "i"th finger electrode and the "i+1"th finger electrode.

$$h_i=g_i=2.6+\{(3.4-2.6)/8\}\times(i-10) \tag{8}$$

Accordingly, the widths h of the tenth through eighteenth finger electrodes and the intervals g thereamong become larger from 2.6 μm to 3.4 μm by 0.1 μm.

The action and effect of the optical deflector of th fifth embodiment are similar to those of the optical deflector of the fourth embodiment.

Other Embodiments

The number of finger electrodes of an interdigital transducer, the widths of the finger electrodes and the intervals thereamong are not limited to those described in the embodiments above and can be set so that the interdigital transducer will have a desired characteristic. In the embodiments above, both the widths of the finger electrodes and the intervals thereamong are varied gradually so that the interdigital transducer will have a fixed duty factor and accordingly a fixed oscillation efficiency. However, for example, it is possible to fix the widths of the finger electrodes while gradually varying the intervals thereamong.

Prism couplers can be provided as the light incidence means and the light emergence means, and it is also possible to use end surfaces of the waveguide as a light beam incidence surface and a light beam emergence surface. Moreover, it is possible to provide a converging lens section, a diverging lens section and a collimating lens section, etc. in the waveguide.

Further, it is preferred that the interdigital transducer is a chirp tilt type. FIGS. 15, 16 and 17 show tilted finger chirp interdigital transducers 72, 73 and 74 respectively. The interdigital transducers 73 and 74 adopt a dog-leg structure for impedance matching with an externally provided high-frequency signal generator. When the wavelength of a laser beam incident to the optical deflector varies, the Bragg angle varies. In each of the interdigital transducers 72 through 74, the finger electrodes extend at different angles so as to excite surface acoustic waves propagated in different directions depending on the wavelength, and thereby, the variation of Bragg angles depending on the wavelength of the laser beam can be corrected. The finger electrodes of an interdigital transducer are not limited to a single type and may be a double type which can inhibit internal reflection and a type which excites surface acoustic waves propagated only in one way.

In the first embodiment, the overlap-weighting of the finger electrodes is carried out by adopting the apodize method only once. However, by further measuring the deflection characteristic of an optical deflector which has an interdigital transducer with finger electrodes overlap-weighted by the apodize method and adopting the apodize method repeatedly, an optical deflector from which an emergent light beam has a more fixed intensity can be obtained.

Figure 18:
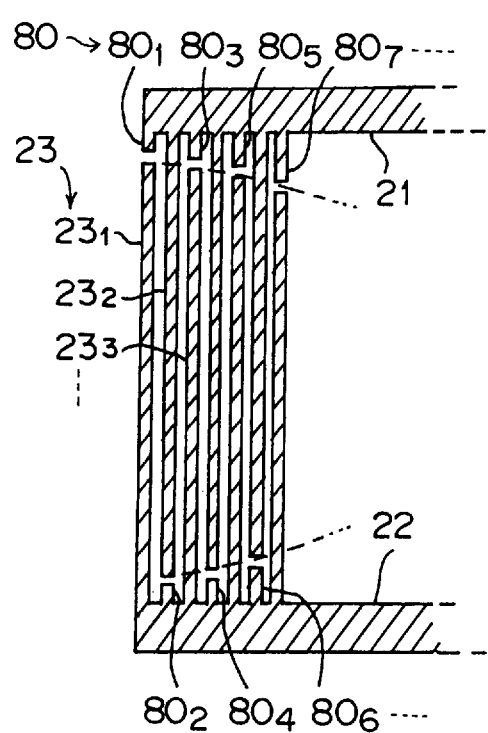
FIG. 18 is a plan view of another modification of the chirp interdigital transducer.

In the first embodiment, since the overlapping lengths of the finger electrodes vary, the density of finger electrodes is small in portions near the pads and large in a central portion. Accordingly, the propagation speed of surface acoustic waves is high in the portions near the pads and is low in the central portion, and thereby, a wavefront is deformed. In order to solve this problem, it is possible to provide dummy electrodes 80 (80$_1$, 80$_2$, 80$_3$, . . . ) as shown in FIG. 18.

In the second through fifth embodiments, the widths of the finger electrodes and the intervals thereamong vary with equal differences, but they do not have to vary with equal differences. For example, like a distributed type delay line used in a pulse compression radar, the finger electrodes may be arranged so that the interdigital transducer will have a characteristic that delay time varies in proportional to frequency. The finger electrodes which excite surface acoustic waves with a end of the frequency band can be arranged in any portion of the chirp interdigital transducer. More specifically, the finger electrodes which excite surface acoustic waves with a end frequency do not have to be arranged in an end portion of the chirp interdigital transducer as described in the second through fifth embodiments and can be arranged in a portion closer to the center of the chirp interdigital transducer.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A manufacturing method of an optical deflector which comprises a waveguide which guides a light beam, an interdigital transducer which is fabricated on the waveguide so as to excite surface acoustic waves, light incidence means for making a light beam couple to the waveguide and light emergence means for making a guided light beam progressing in the waveguide emergent therefrom, the manufacturing method comprising the steps of:

measuring a frequency response of the optical deflector which has an interdigital transducer with nonoverlap-weighted finger electrodes;

calculating an inverse function of the frequency response;

calculating a transducer impulse response by taking inverse Fourier transform of the inverse function;

setting positions and overlapping lengths of finger electrodes of the interdigital transducer based on the transducer impulse response, thereby overlap-weighting the finger electrodes so that an emergent light beam have a fixed intensity.

2. An optical deflector comprising:

a waveguide which guides a light beam;

light incidence receiving means for coupling an incident light beam to the waveguide;

an interdigital transducer disposed on the waveguide so as to excite surface acoustic waves, the interdigital transducer comprising a chirp interdigital transducer having finger electrodes, the width and periodicity of said finger electrodes being arranged so as to deflect said incident light beam and generate a diffracted light beam having a substantially fixed intensity over a predetermined deflection range; and light emergence means operative as an outlet to allow said diffracted light beam to exit said waveguide.

3. An optical deflector as claimed in claim 2, wherein the finger electrodes of the interdigital transducer are overlap-weighted so that said diffracted light beam has a substantially fixed intensity over said predetermined deflection range.

4. An optical deflector as claimed in claim 2, wherein the finger electrodes of the interdigital transducer have fixed widths and fixed periodicity at a portion which excites surface acoustic waves with an end frequency of a frequency band.

5. An optical deflector as claimed in claim 4, wherein the end frequency of the frequency band means a high-frequency end of the frequency band.

6. An optical deflector as claimed in claim 4, wherein the end frequency of the frequency band means a high-frequency end and a low-frequency end of the frequency band.

7. An optical deflector as claimed in claim 2, wherein the interdigital transducer has smaller variation in finger electrodes periodicity at a portion which excites surface acoustic waves with an end frequency of a frequency band than at a portion which excites surface acoustic waves with a central frequency of the frequency band.

8. An optical deflector as claimed in claim 7, wherein the interdigital transducer further has smaller variation in widths of the finger electrodes at the portion which excites the surface acoustic waves with the end frequency of the frequency band than at the portion which excites the surface acoustic waves with the central frequency of the frequency band.

9. An optical deflector as claimed in claim 7, wherein the end frequency of the frequency band means a high-frequency end of the frequency band.

10. An optical deflector as claimed in claim 7, wherein the end frequency of the frequency band means a low-frequency end and a high-frequency end of the frequency band.

11. An optical deflector as claimed in claim 2, wherein:

the interdigital transducer has two mutually opposite pads and finger electrodes which extend alternately from one pad toward the other pad; and the finger electrodes have gradually varying widths and periodicity.

12. An optical deflector as claimed in claim 2, wherein the interdigital transducer is a tilted finger chirp transducer.

13. An optical deflector as claimed in claim 2, wherein the interdigital transducer has a dummy finger electrode to suppress a disorder in a wavefront of a surface acoustic wave.

14. A scanning optical system which converges a light beam emitted from a light source through an optical deflector as claimed in claim 2 and other optical elements and scans the light beam on a scanning surface linearly.

* * * * *